(12) United States Patent
Brodie

(10) Patent No.: US 9,926,718 B2
(45) Date of Patent: Mar. 27, 2018

(54) FLEXIBLE COUPLING

(71) Applicant: JMB MANUFACTURING PTY LTD, Augustine Heights, Queensland (AU)

(72) Inventor: Ian Charles Brodie, Augustine Heights (AU)

(73) Assignee: JMB Manufacturing Pty Ltd, Queensland (AU)

(*) Notice: Subject to any disclaimer, the term of this patent is extended or adjusted under 35 U.S.C. 154(b) by 17 days.

(21) Appl. No.: 14/895,073

(22) PCT Filed: May 15, 2014

(86) PCT No.: PCT/AU2014/050039
§ 371 (c)(1),
(2) Date: Dec. 1, 2015

(87) PCT Pub. No.: WO2014/194377
PCT Pub. Date: Dec. 11, 2014

(65) Prior Publication Data
US 2016/0123032 A1 May 5, 2016

(30) Foreign Application Priority Data
Jun. 4, 2013 (AU) ................. 2013902005

(51) Int. Cl.
*E01F 9/00* (2016.01)
*E04H 12/22* (2006.01)
*E01F 9/627* (2016.01)
*F16B 9/00* (2006.01)
*E01F 9/681* (2016.01)
(Continued)

(52) U.S. Cl.
CPC ......... *E04H 12/2292* (2013.01); *E01F 9/629* (2016.02); *E01F 9/677* (2016.02); *E01F 9/681* (2016.02); *E01F 9/685* (2016.02); *F16B 9/00* (2013.01)

(58) Field of Classification Search
CPC ...... E04H 12/2292; E01F 9/629; E01F 9/677; E01F 9/681; E01F 9/685; F16B 9/00
See application file for complete search history.

(56) References Cited

U.S. PATENT DOCUMENTS 3,485,201 A * 12/1969 Kelley .................. E01F 9/629
116/63 P
3,838,661 A 10/1974 Medley
(Continued)

OTHER PUBLICATIONS

International Search Report from corresponding application PCT/AU2014/050039 dated Jun. 16, 2014, 4 pages.

*Primary Examiner* — Abigail A Risic
(74) *Attorney, Agent, or Firm* — Brake Hughes Bellermann LLP

(57) ABSTRACT

The invention relates to a flexible coupling comprising a lower assembly (10) having a spigot member (20), and an upper assembly (60) having a recess adapted to receive the spigot member, thereby allowing articulation of the upper assembly (60) with respect to the lower assembly (10) in any direction. A complementary indexing means is adapted to circumferentially align the lower assembly (10) and the upper assembly (60), and a single resilient member (65) interconnects the lower and upper assemblies, wherein the lower and upper assemblies are urged into mutual engagement against said articulation.

13 Claims, 13 Drawing Sheets

(51) Int. Cl.
*E01F 9/685* (2016.01)
*E01F 9/677* (2016.01)

(56) References Cited

U.S. PATENT DOCUMENTS

| | | | | |
|---|---|---|---|---|
| 4,806,046 A * | 2/1989 | Clark | ...................... | E01F 9/629 |
| | | | | 40/608 |
| 5,199,814 A * | 4/1993 | Clark | ...................... | E01F 9/629 |
| | | | | 116/63 P |
| 5,354,144 A * | 10/1994 | Lizakowski | ............ | E01F 9/629 |
| | | | | 40/612 |
| 5,397,197 A | 3/1995 | Beavers | | |
| 5,468,188 A | 11/1995 | Day | | |
| 6,149,340 A * | 11/2000 | Pateman | ................ | E01F 9/627 |
| | | | | 40/608 |
| 6,416,248 B1 * | 7/2002 | Clark | ...................... | E01F 9/635 |
| | | | | 116/63 R |
| 7,377,717 B2 * | 5/2008 | Clark | ...................... | E01F 9/629 |
| | | | | 116/63 R |
| 7,726,056 B2 * | 6/2010 | Brodie | ............... | E04H 12/2215 |
| | | | | 248/160 |
| 7,849,617 B2 * | 12/2010 | Intagliata | ............... | E01F 9/629 |
| | | | | 248/160 |
| 7,930,859 B1 * | 4/2011 | Eslambolchi | ....... | E04H 12/2269 |
| | | | | 248/159 |
| 8,235,348 B1 * | 8/2012 | Curtis | .................... | E01F 9/629 |
| | | | | 248/519 |
| 2007/0053743 A1 * | 3/2007 | Clark | ...................... | E01F 9/629 |
| | | | | 404/10 |
| 2008/0209784 A1 | 9/2008 | Brodie | | |
| 2013/0022396 A1 * | 1/2013 | Hannah | .................. | E01F 9/629 |
| | | | | 404/10 |
| 2015/0121733 A1 * | 5/2015 | Oberkofler | .............. | E01F 9/673 |
| | | | | 40/607.06 |

\* cited by examiner

FLEXIBLE COUPLING

CROSS REFERENCE TO RELATED APPLICATION(S)

This application is a 35 U.S.C. 371 National Phase Entry Application from PCT/AU2014/050039, filed May 15, 2014, and designating the U.S., and also claims priority to Australian Application No. 2013902005, filed Jun. 4, 2013, the disclosures of which are incorporated by reference herein in their entirety.

FIELD OF THE INVENTION

This invention relates to a flexible coupling or joint suitable for a post.

In particular, the invention has particular application in respect of a guide post which is required to realign itself to the correct orientation following an impact from a motor vehicle or the like. However, it is envisaged that the fundamental principles of the invention will find application in a wide range of different circumstances requiring a flexible coupling capable of recovering to its original position after a post affixed thereto has been displaced.

BACKGROUND OF THE INVENTION

Guide posts are typically used to delineate the edge of a road formation, and assist a road user by indicating the alignment of the road ahead. Guide posts are normally not provided an urban roads that are well lit. However, they may be provided on unlit urban roads (kerbed or un-kerbed) with poor alignment or inadequate edge delineation, and are usually provided on all rural divided and undivided roads.

The guide posts are typically made from timber, metal or plastic, and support a delineator positioned approximately 1000 mm above ground level. Delineators are small retro-reflectors or panels of retro-reflective material which provide a coherent pattern of delineation of the edges of the road as an aid to night driving. The guide posts are often embedded directly into the ground, wedged into a ground sleeve, or welded to a flange and bolted to the road or traffic island.

The guide posts may be rigid, such that they will either fracture or remain intact when impacted by a vehicle. The guide posts may be semi-flexible, such that the guide post fails by bending when impacted by a vehicle. In either case, the guide posts will require maintenance intervention to restore them to their previous state.

Alternatively, the guide posts may be flexible. Such spring-back or recovery signage is known and generally comprises one of two types. The first type is an elastomer based product that uses a block of rubber, polyurethane or the like at a fulcrum point. Upon collision the guide post travels toward the ground by way of the elastic deformation of the elastomer material. When released the guide post comes back to a substantially vertical position. However, elastomer based products typically suffer from "flutter", which is the tendency of the post to move around from either the wind generated by passing traffic or atmospheric wind. Flutter is undesirable as it makes signage difficult to read, can cause the post to momentarily lean into the path of oncoming traffic, and in extreme cases of atmospheric wind, the post can lean over into traffic lanes. Damage to the post usually requires the replacement of the entire assembly. Furthermore, after a number of deflection cycles, the block of rubber, polyurethane or the like used in elastomer based products tends to suffer from plastic deformation, and ceases to function effectively.

The second type is a mechanical product which uses a spring and cables to provide the self righting force, and generally uses a mechanical mechanism for the fulcrum. One example of this is provided by U.S. Pat. No. 5,199,814 (Clark et al.), which describes a short plastic post which is used for delineation of vehicle paths comprising facing truncated conical load bearing cells. One cell has its conical base secured to the ground and one cell has it conical base secured to an upstanding plastic post. The truncated tips of both cells bear against each other with their axes normally aligned. The post extends upwardly from the conical base and contains a compression spring which tensions two cables which pass through the two cells. The tensioned cables pull the tips of the two cells to urge the post to remain vertically aligned.

However, there are several drawbacks to Clark's configuration. First, the Clark apparatus is a unitary assembly, providing the self-righting apparatus and post as one. The small conical cell tips are not conducive to supporting a large or tall post. Further, the apparatus is not amenable to retrofit of typical guide posts. Second, the Clark apparatus requires replacement of substantially all of the apparatus even if it is only the post that has been damaged. Third, the Clark apparatus does not have an effective mechanism which ensures that the post returns to the correct orientation once in the vertical position. That is, the top and bottom cells may not correctly realign, such that the post is rotated with respect to the lower cell. Finally, the Clark apparatus is expensive to produce, due to the complexity of the configuration of the compression spring, tensioned cables and various cable passages.

Accordingly, it can be seen that a need exists for a flexible coupling designed and developed to overcome, or at least substantially ameliorate, the disadvantages and shortcomings of conventional couplings used for spring-back or recovery signage.

SUMMARY OF THE INVENTION

The present invention provides a flexible coupling according to the following claims.

In a preferred embodiment, the invention resides broadly in a flexible coupling comprising, a lower assembly having a spigot member; an upper assembly having a recess adapted to receive the spigot member, the spigot member and recess being mutually configured to allow articulation of the upper assembly with respect to the lower assembly in any direction; complementary indexing means adapted to circumferentially align the lower assembly and the upper assembly; and a single resilient member interconnecting the lower and upper assemblies, wherein the lower and upper assemblies are urged into mutual engagement against said articulation.

Preferably, the single resilient member is a drawbar spring or a tension spring.

The spigot member includes means to constrain initial impact movement of the upper assembly to minimise lateral displacement. Preferably, the means to constrain initial impact movement comprises a substantially vertical annular surface located at a base portion of the spigot member. The spigot member comprises an upper portion that is partly conical, frusto-conical or spherical in shape, and allows connection to the single resilient member. Moreover, the upper portion of the spigot member is shaped to allow the upper assembly to rotate approximately +/−30° around a central longitudinal axis of the flexible coupling.

The complementary indexing means includes at least one locating element adapted to engage a corresponding locating slot, which is located at a base portion of the upper assembly. Preferably, the complementary indexing means further includes at least one helical ramp to direct the at least one locating element into the corresponding, locating slot. In the preferred embodiment, the at least one helical ramp is adjacent a middle portion of the spigot member.

In use, the lower assembly of the flexible coupling is releasably attached to a ground engagement means, and the upper assembly is attached to a post member. The flexible coupling may further comprising a guide post attached to the post member.

BRIEF DESCRIPTION OF THE DRAWINGS

It will be appreciated by those of relevant skill that the disclosed embodiments are merely exemplary of the invention, and that the invention may be embodied in various and alternative forms. The invention will now be described in a non-limiting manner with reference to the accompanying drawings which illustrate a preferred embodiment of the invention, wherein.

Figure 1:
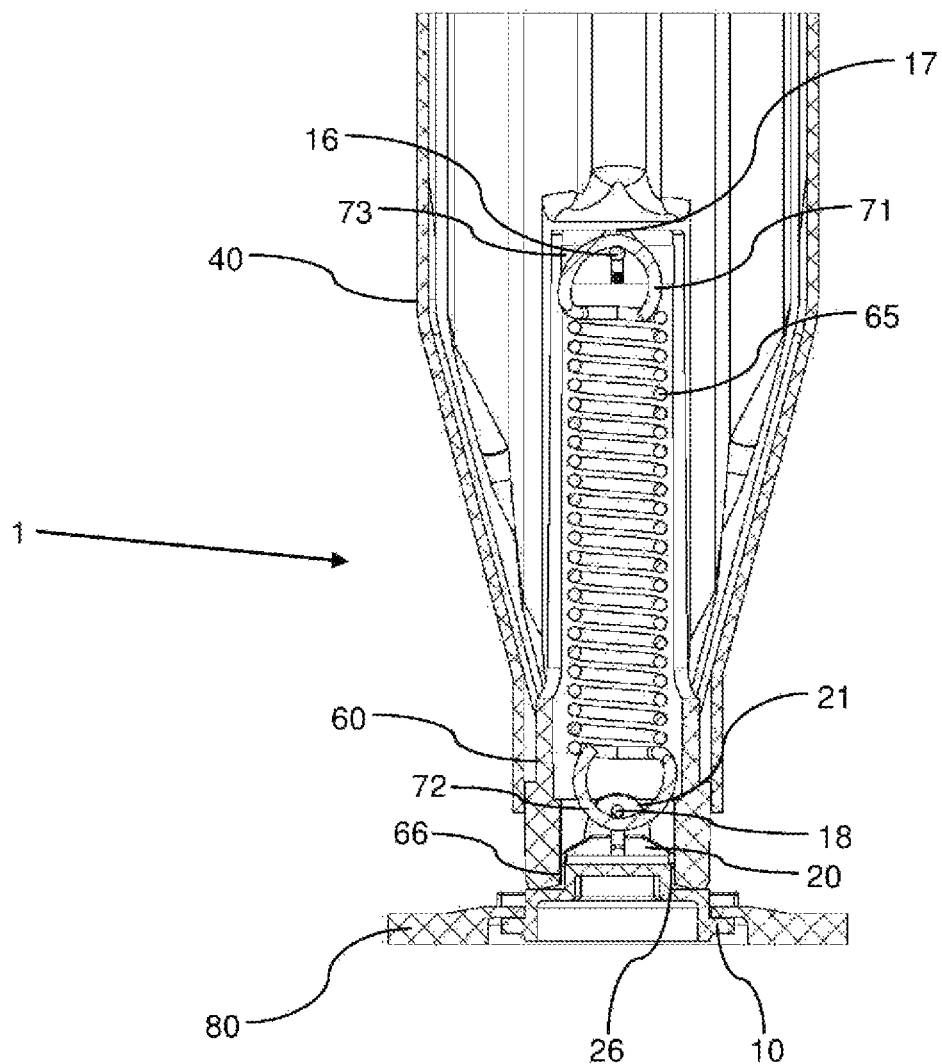
FIG. 1 is a sectional view through the apparatus in the vertical r at rest position.

It will be appreciated by those of relevant skill that the figures are not necessarily to scale, with some features exaggerated or minimised to show details of particular components.

Like numerals in the drawings refer to like parts.

DETAILED DESCRIPTION

In the following discussion and in the claims that follow, the term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment", "alternative embodiment" and the like mean "one or more (but not all) embodiments of the disclosed invention(s)", unless expressly specified otherwise. A reference to "another embodiment" in describing an embodiment does not imply that the referenced embodiment is mutually exclusive with another embodiment (e.g., an embodiment described before the referenced embodiment), unless expressly specified otherwise.

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

The terms "including", "comprising" and variations thereof mean "including but not limited to unless expressly specified otherwise. The terms "a", "an" and "the" mean "one or more", unless expressly specified otherwise. The term ""plurality" means "two or more", unless expressly specified otherwise.

The functionality and/or the features of a single device or component that is described may be alternatively embodied by one or more other devices or components which are described but are not explicitly described as having such functionality/features. Thus, other embodiments need not include the described device or component itself, but rather can include the one or more other devices or components which would, in those other embodiments, have such functionality I features.

No embodiment of method steps or device elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Figure 2:
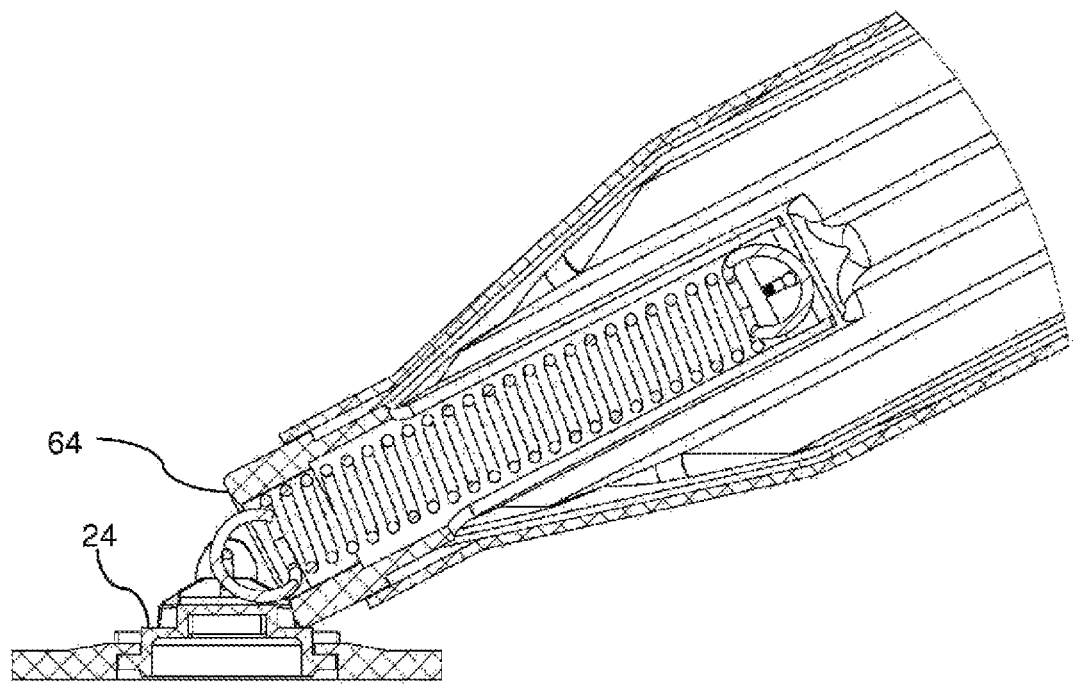
FIG. 2 is a sectional view through the apparatus of FIG. 1, operatively displaced.

Turning now to FIGS. 1 and 2, there is shown an apparatus 1 according to a preferred embodiment of the present invention. The apparatus 1 may be considered a 360° degree universal hinge arrangement defined between a lower assembly 10 and an upper assembly 60. The lower assembly is attached to a ground engaging means 80. In this embodiment, the ground engaging means comprises a base plate which may be bolted to a traffic island or other surface. A post member 40 is adapted to engage with upper assembly 60, in this case by sliding over the upper assembly. Post member 40 is preferably blow moulded from HDPE or a similar material.

The upper and lower assemblies may be manufactured from a number of various materials in various forms, but is preferably moulded from a flexible, resilient material such as plastic, nylon or a high modulus elastomer. In one preferred embodiment, the upper and lower assemblies may be injection moulded from nylon 6 or nylon 66. In an alternative preferred embodiment, the assemblies may be made from a composite, for example nylon reinforced with glass fibres.

In an alternative embodiment, the upper and lower assemblies may be manufactured from metal such as various grades of steel, titanium and the like. These metals may be cast using the lost wax method (also known as investment casting), with some of the finer details completed by CNC machining. Alternatively, the assemblies may be CNC machined from a suitable metal blank. If made from metal, the releasable clip may be painted, powder coated, chrome-plated, cadmium-plated, anodize-plated, or otherwise finished to provide an aesthetically pleasing appearance and to protect the apparatus from environmental effects. Other suitable coatings may include moulded rubber, fusion bonded epoxies, extruded polyethylene, and combinations thereof or the like. Alternatively, the apparatus or various parts thereof may be covered with a protective sleeve. The protective sleeve may comprise aluminum alloy, a polymer coating, a glass reinforced thermoset material (such as, for example, a glass or fibreglass reinforced plastic) or the like. Individual components of the releasable locking clip may be protected by differing materials.

Lower assembly 10 and upper assembly 60 are interconnected by a single resilient member 65, which may comprise a tension spring as shown, a drawbar spring, or the like. The tension spring comprises a central helical section which is bounded by an upper spring loop 71 at the top end of the spring and a lower spring loop 72 at the bottom end of the spring. The upper spring loop 71 is connected to the upper assembly 60 by a removable upper retaining pin 16 which is supported by a pin retaining cradle 17. In the embodiment shown, pin retaining cradle 17 comprises two diametrically opposed members which extend radially from the inner surface of the upper assembly towards the central longitudinal axis of the upper assembly. The opposed members each have a centrally located slot or notch which extends downwardly from the upper surface of each opposed member and terminates at a surface which supports one end of pin 16. To ensure that the top of the spring does not rotate relative to the upper assembly 60, the upper spring loop 71 is restrained by a loop side support 73 that abuts the upper spring loop. In a similar fashion, lower spring loop 72 is connected to the lower assembly 10 by retaining pin 18, which may also be removable.

The spring is used as the energy mechanism to reorientate the upper and lower assemblies once they have been deflected, and uses the lowest spring rating possible. This has the effect of minimising the force increase on the universal hinge arrangement when the upper assembly 60 is deflected from the vertical to the horizontal position. As any attached post pivots further towards the horizontal, the apparent force weight of the post or (moment of the post) increases at a greater rate to that of the spring force. The result of this is that the force acting on the post at horizontal is reduced and the spring appears to lose force as it pivots (this is of course not the case; it is just a case of the two force systems coming closer to being balanced). This effect reduces the speed and the force at which the attached post comes back up, so when a vehicle is travelling over the post the force of the post hitting the underneath of the vehicle from horizontal is greatly reduced, thus reducing the damage to both the post and vehicle.

An upper mating surface 64 at the base of the upper assembly 60 and a corresponding lower mating surface 24 upon lower assembly 10 are in close alignment when the apparatus is in the vertical position. The mating surfaces are preferably 5-6 mm wide, and have as large a diameter as practical so as to prevent initial motion of the upper assembly 60 relative to the lower assembly 10. The mating surfaces make the apparatus more stable and any attached post less prone to flutter. Furthermore, the force provided by the spring acts on mating surfaces 24 and 64 to create a preload or initial resistance to motion of the upper assembly off the vertical. This initial resistance increases the posts stability in the vertical position meaning it does not flutter due to wind buffeting. Preferably, the preload is set to resist a bending moment equal to that induced by a 50 km/h-100 km/h wind impinging on the post.

Lower assembly 10 includes a spigot member 20 comprising an upper portion 21 that is partly conical, frusta-conical or spherical in shape. A corresponding recess in upper assembly 60 is adapted to receive spigot member 20 such that the upper assembly is able to freely pivot or articulate around the spigot member in any direction.

The spigot member 20 includes means to constrain movement of the upper assembly 60 following an initial impact. To minimise the lateral displacement of the upper assembly 60, the spigot member 20 may include a substantially vertical annular surface 26 located at a base portion of the spigot member which cooperates with an equivalent vertical annular surface 66 located at a base portion of the upper assembly. Vertical annular surfaces 26 and 66 assist in absorbing the shear forces from the initial impact, which prevents the spring from experiencing shear forces which may damage its operation. The vertical annular faces 26 and 66 also ensure that following an impact, a rotational moment is instantly imparted to upper assembly 60, causing it to rotate away from the vertical axis of the apparatus. If this constraint did not exist then the upper assembly 60 would first travel laterally relative to lower assembly 10, until the spring tension was sufficient to force the rotation, resulting in an increased likelihood of damage to the spring.

Following an impact, after which the post member 40 and upper assembly 60 are substantially horizontal, the spring will be at full extension. At this point, the force with which the spring pushes back will be sufficient to induce a sufficiently powerful moment to vertically re-align the post member 40 and upper assembly 60 once they are free of vehicle interference or any other interference.

Upon returning to vertical it is important that the upper assembly 60 returns to the same orientation as it was prior to the impact, as otherwise the delineation or information function of the post would not be as effective. There are several mechanisms which ensure the correct re-alignment of upper assembly 60 with respect to lower assembly 10.

Figure 3A:
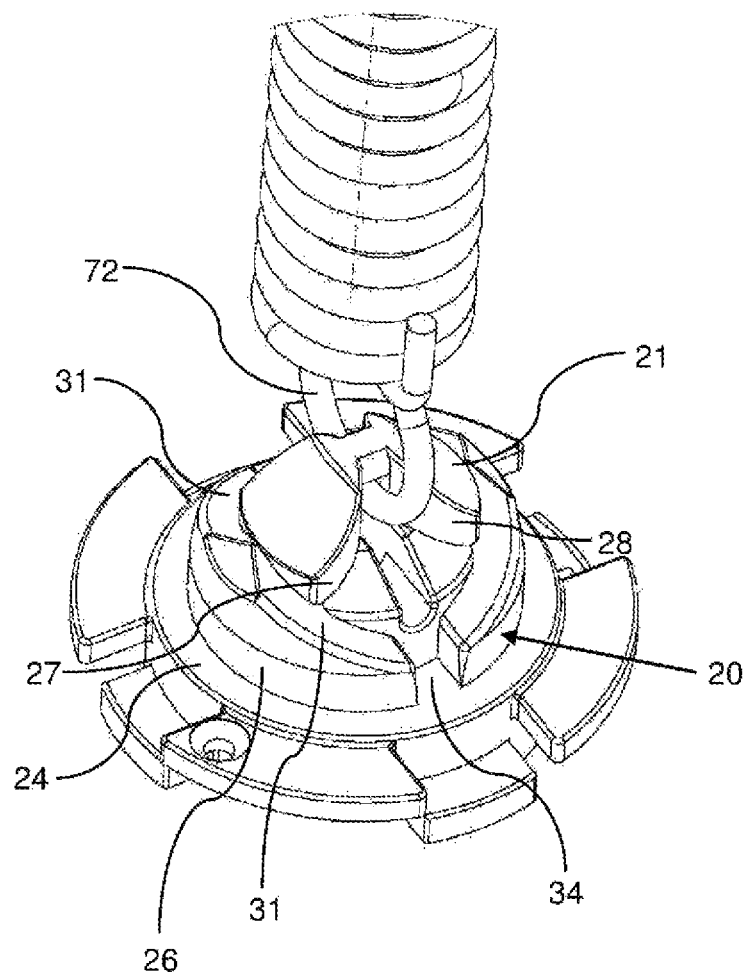
FIG. 3A is a perspective view of the lower assembly.
Figure 3B:
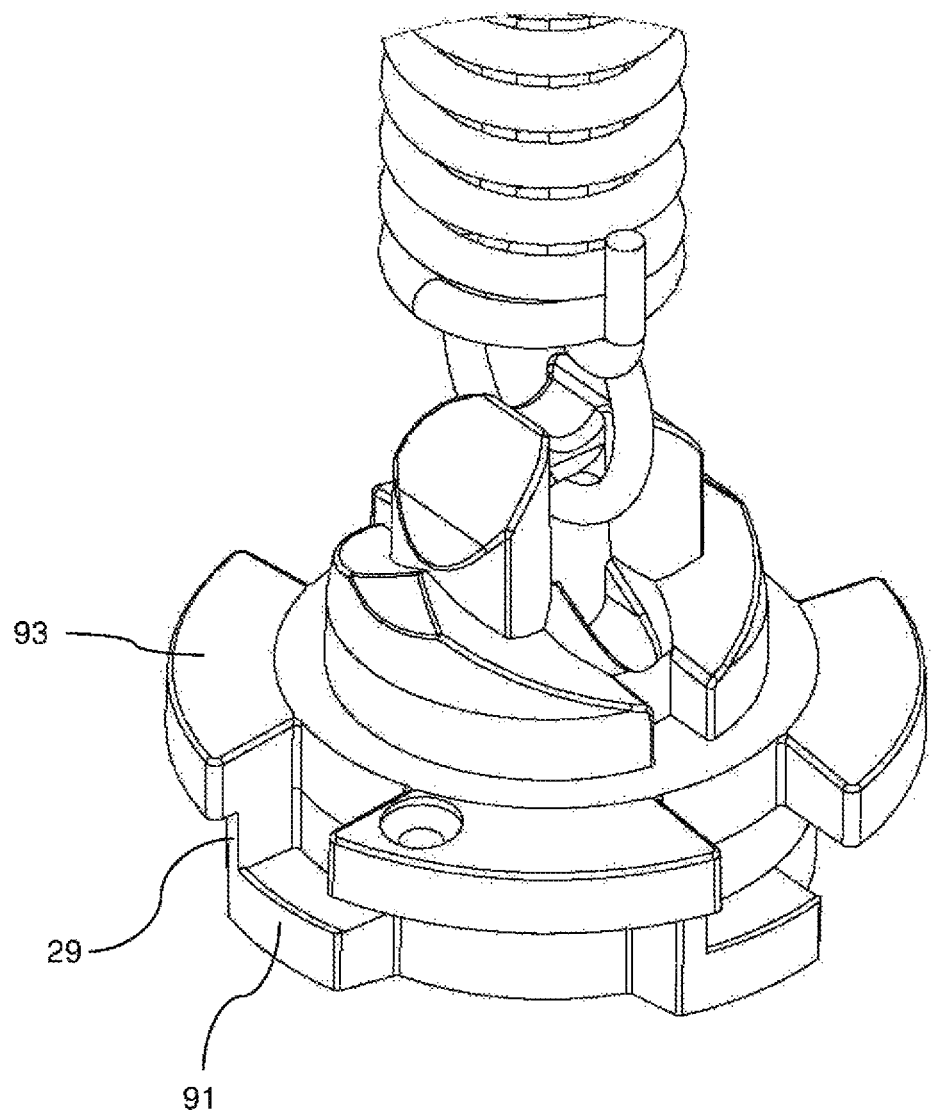
FIG. 3B is a perspective view of an alternative embodiment of the lower assembly.

The first mechanism uses the spring as a torsional member to prevent the upper assembly from freely rotating more than approximately +/−30° around a central longitudinal axis of the flexible coupling. As shown in FIG. 3A, upper portion 21 of spigot member 20 includes curved side walls 27 and 28. The curved side walls allow lower spring loop 72 to freely rotate approximately +/−30° relative to lower assembly 10. The curved side walls prevent further free rotation of the upper assembly beyond approximately +/−30°, and any rotation of the upper assembly beyond that point will be recovered due to the spring returning to its torsional equilibrium state.

The second mechanism relies upon a complementary indexing means which is adapted to align the lower assembly with the upper assembly as the upper assembly returns to the vertical position following an impact. At approximately 40° from the vertical, two diametrically opposed locating members engage with the helical ramps 31 located upon the lower assembly. The locating members are positioned at the base of the upper assembly and extend radially from the vertical annular surface of the upper assembly towards the central longitudinal axis of the upper assembly. The force of the spring returning to its equilibrium state directs the locating members to travel down the gradient of helical ramps 31, which are located above vertical annular surface 26. This ensures that upper assembly turns relative to the spigot member 20 about the centre axis of the upper assembly, thus correcting any rotation less than approximately +/−30°.

The third mechanism relies upon the locating members dropping into corresponding locating slots 34 which are positioned at the end of the helical ramps 31 on spigot member 20. This mechanically locks the upper assembly back into its original orientation relative to the lower assembly.

It will be appreciated that the exact form of the complementary indexing means may be varied. For example, the complementary indexing means may comprise a single locating member co-operating with a single helical ramp and locating slot. Alternatively, there may be three or four locating members which co-operate with a matching number of helical ramps and locating slots. In an alternative embodiment, the locating members and helical ramps may be reversed with the locating members formed on the lower assembly and the helical ramps formed on the upper assembly. The characteristics of the complementary indexing means will depend on the exact configuration chosen. In the preferred embodiment as shown, helical ramps 31 have a constant gradient of 18°, an inner radius of 14.0 mm and an outer radius of 19.5 mm. Locating slots 34 are approximately 6 mm wide and 6 mm deep, and extend to the lower mating surface 24.

In an alternative embodiment of the invention, a drawbar spring, rather than a tension spring, is employed as the single resilient member. In a drawbar spring the load is applied at the ends of long steel loops which pass through the spring's centre and are hooked around the opposite end, thus compressing the spring upon loading. Accordingly, they are capable of resisting loads far in excess of the compression spring closing force and are particularly suited to the present invention where a positive stop or overload protection is desirable. Also, drawbar springs offer a built-in safety feature in that, upon breaking, they will continue to carry a load. When a regular tension spring will be required to undergo many cycles of deflection that will result in failure, springs fitted with a drawbar can be used to reduce the chance of failure.

FIG. 3A shows an alternative embodiment of the lower assembly, in which a vertical rib 29 is located between tab 91 and upper flange member 93. The vertical rib 29 aids in the retention of the lower assembly to a ground engagement means, and increases the shock resistance under impact. The vertical rib 29 may be located between a single, or a plurality, of tab/upper flange members.

Figure 4:
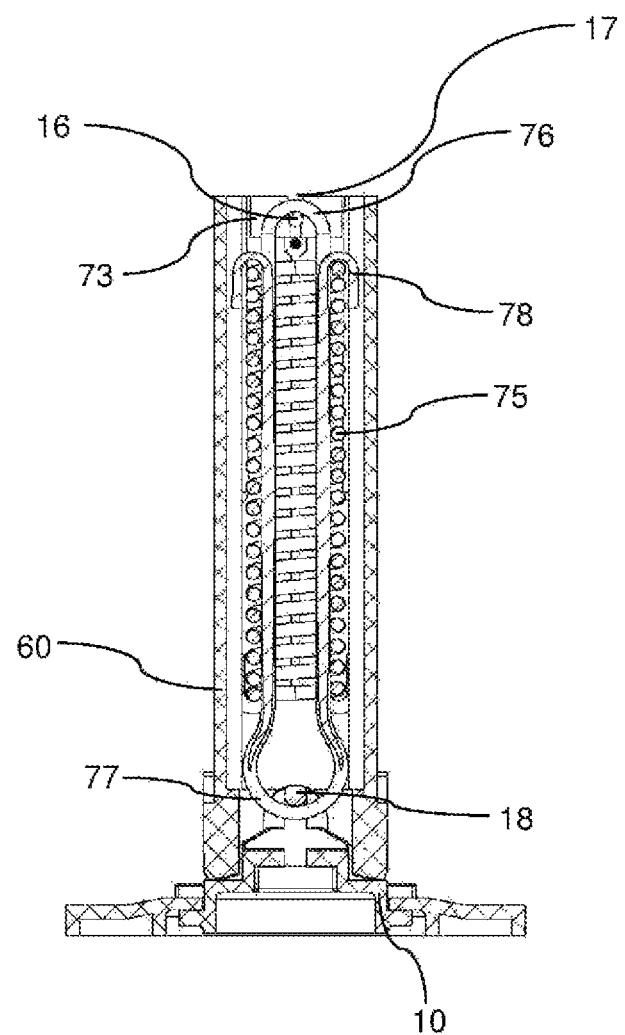
FIG. 4 is a front sectional view through the apparatus of FIG. 1, wherein a drawbar spring is used as the single resilient member.
Figure 5:
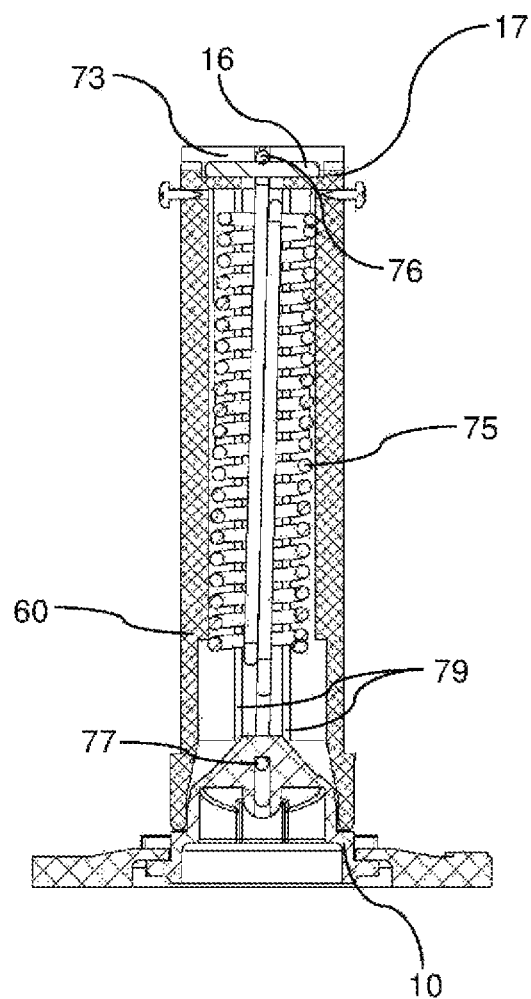
FIG. 5 is a side sectional view through the apparatus of FIG. 4.

FIGS. 4 and 5 show a lower assembly 10 and upper assembly 60 which are interconnected by a drawbar spring 75. The drawbar spring comprises a central helical section which is bounded by upper drawbar loop 76 at the top end of the drawbar spring and a lower drawbar loop 77 at the bottom end of the drawbar spring. The upper drawbar loop 76 is connected to the upper assembly 60 by a removable upper retaining pin 16 which is supported by a pin retaining cradle 17. In the embodiment shown, pin retaining cradle 17 comprises two diametrically opposed members which extend radially from the inner surface of the upper assembly towards the central longitudinal axis of the upper assembly. The opposed members each have a centrally located slot or notch which extends downwardly from the upper surface of each opposed member and terminates at a surface which supports an end of pin 16. To ensure that the top of the drawbar spring does not rotate relative to the upper assembly 60, the upper drawbar loop 76 is restrained by a loop side support 73 that abuts the upper drawbar loop. To further restrain drawbar spring 75, longitudinal channels 79 may be formed upon the interior surface of upper assembly 60 to engage with drawbar spring tail members 78, thereby further preventing independent rotation between the upper assembly and the drawbar spring. Lower drawbar loop 77 is preferably connected to the lower assembly 10 by fixed retaining pin 18. Alternatively, retaining pin 18 may be removable.

The complementary indexing ensures that the upper assembly correctly reorientates relative to the lower assembly, and allows a single resilient member, whose strength is lower than otherwise would be necessary, to be used in the apparatus. This obviates the need for a stronger spring and the accompanying tensioned cables and various cable passages, thereby significantly reducing the complexity of the apparatus and the resulting manufacturing costs.

Figure 6:
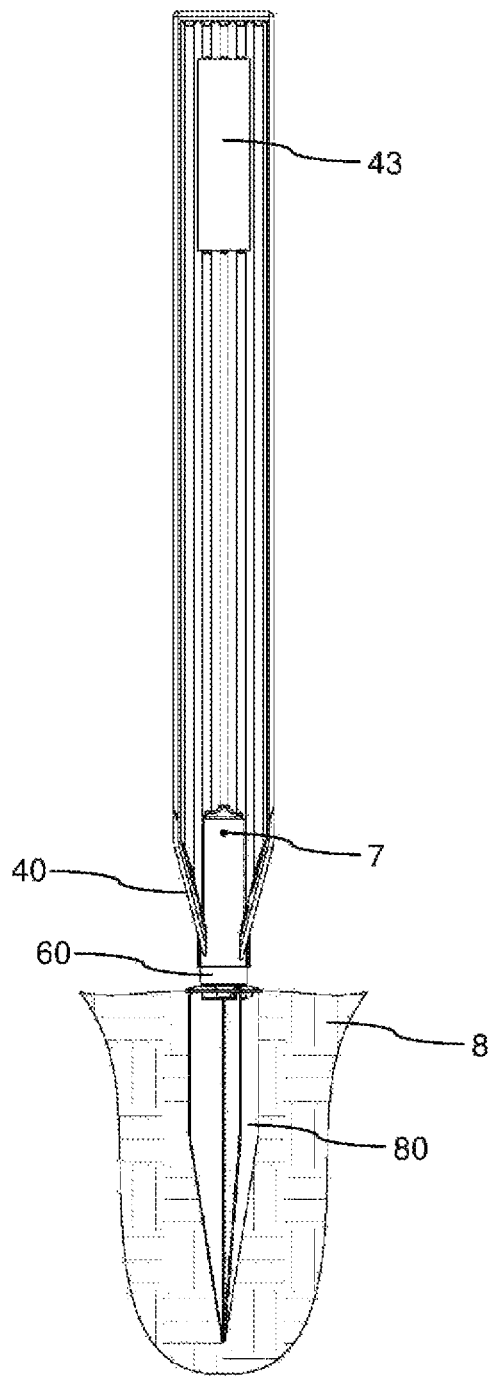
FIG. 6 is a view of the apparatus of FIG. 1 in use with a guide post and ground spike.

Referring now to FIG. 6, the apparatus is shown in use with a guide post and a ground engagement means 80, which may comprise a ground spike as shown, a base plate, or the like. The ground spike may be installed via a manual hammer dolly or a jack, hammer dolly, such that it sits flush or near flush to the surrounding ground. This ensures that the ground spike is not vulnerable to direct impact damage, and also ensures that there are no dangerous features above ground level which could cause vehicle or tyre damage. Preferably, the ground spike is configured to allow in situ change of the apparatus or guide post without having to remove the ground spike from the ground 8. The ground spike is preferably fabricated from pressed steel components, welded construction and is hot dipped galvanised.

A guide post having a delineator 43 is attached to the upper assembly 60 by virtue of post member 40. The delineator may be integrally formed with the guide post, or may be adhered, screwed on, bolted on or otherwise attached to the post to provide reflection of light, thus permitting the guide post to be readily visible under night driving conditions.

Post member 40 may be integrally formed with the guide post, and may be formed from any suitable lightweight materials that are impact resistant Alternatively, the post member may be a removable sleeve adapted to slidably engage upper assembly 60. Using a removable sleeve means that it is possible to customise post member 40 for various post diameters and designs. In a preferred embodiment, the post member overlies upper assembly 60, and is secured by at least one securing screw 7 that is threaded into the upper assembly. Securing of post member 40 to upper assembly 60 may take place by any other suitable means, such as, but not limited to, self locking bolts, cooperating bolts and nuts, latches, clasps, split pins, clips, rivet nuts, blind rivets or any other comparable fastening means. In an alternative embodiment, post member 40 may slidably engage upper assembly 60 such that upper assembly 60 partially overlies post member 40.

Figure 7:
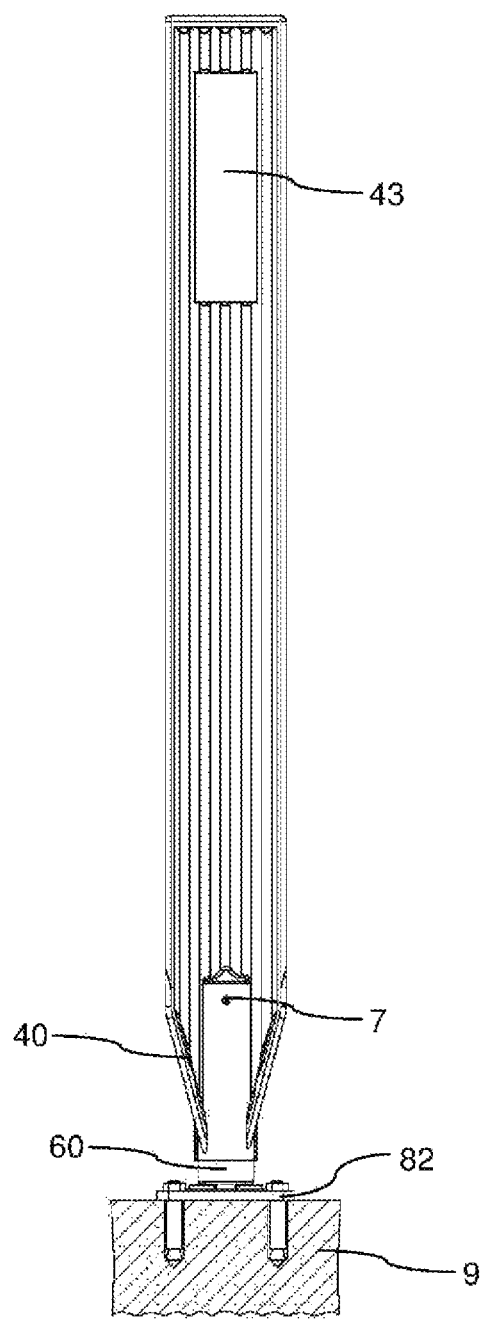
FIG. 7 is view of the apparatus of FIG. 1 in use with a guide post and base plate.

FIG. 7 shows the apparatus in use with a guide post and a surface mount installation. A base plate 82 is attached to a pre-existing traffic island 9 using appropriate anchor bolts, and the lower assembly of the apparatus is connected to the base plate. Alternatively, the base plate can be adhered to the surface of traffic island 9 by a suitable adhesive. Preferably, the base plate is injection moulded from nylon or similar materials, and is configured to allow in situ change of the apparatus or guide post without having to remove the base plate from the traffic island 9. A guide post having a delineator 43 is attached to the upper assembly 60 by virtue of post member 40. Post member 40 is secured to upper assembly 60 by any suitable means, such as screw 7.

Figure 8:
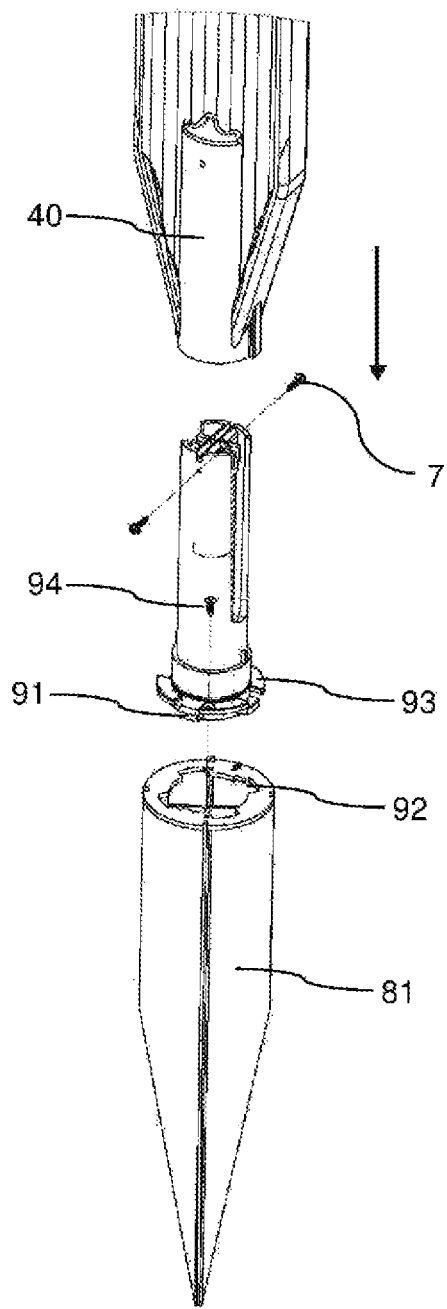
FIG. 8 is a perspective view of the apparatus with a quick-release ground spike.

The lower assembly 10 may be formed with a quick-release attachment means, which allows the apparatus to be quickly inserted into a ground engagement means and locked into place. As shown in FIG. 8, lower assembly 10 may be formed with four equi-spaced tabs 91 which extend outwardly from the base of the lower assembly. Tabs 91 are sized to fit into corresponding slots 92 formed on the upper surface of ground spike 81. Slots 92 may be formed in a capture ring which is attached to ground spike 81, or they may be integrally formed with the ground spike.

To ensure that the lower assembly 10 can be attached to the ground spike 81 in the correct orientation, the lower assembly may include a locating means which cooperates with a corresponding locating means on ground spike 81. For example, one of the tabs 91 may extend outwardly more than the other tabs, and can only be inserted into a similarly sized slot formed on the upper surface of ground spike 81. Other alternatives include a tab having a different thickness, angle or shape. In an alternative embodiment, the locating means may be formed on an area other than the locating tabs 91 on lower assembly 10.

To attach lower assembly 10 to the ground spike 81, tabs 91 are oriented with the corresponding slots 92, and the lower assembly is inserted until upper flange members 93 engage with the upper surface of the ground spike. The lower assembly may then be turned or twisted and locked into place. The locking mechanism preferably consists of two separate features working together. The first feature is a stop lug that prevents rotation past a 45 degree twist. The stop lug may be located either on the ground spike or on the lower assembly. The second feature is a locking screw 94 that extends through an upper flange member 93 into the upper surface of the ground spike. To complete installation of a post, post member 40 may then be attached to upper assembly 60, and secured in place by securing screws 7.

To remove the lower assembly from the ground spike requires a screw driver or similar to remove locking screw 94, the lower assembly to be twisted the opposite way to which it was engaged, and then pulled out from the ground spike. In an alternative embodiment, the second locking mechanism may comprising a flexible clip mounted on the lower assembly that is captured by a complementary notch or groove formed upon ground spike 81. To remove the lower assembly from the ground spike requires a screw driver to be inserted through an access slot between the lower assembly and ground spike. The flexible clip is pushed back by the screwdriver releasing it from the complementary notch or groove and freeing the lower assembly to twist back out the opposite way to which it was engaged.

Figure 9:
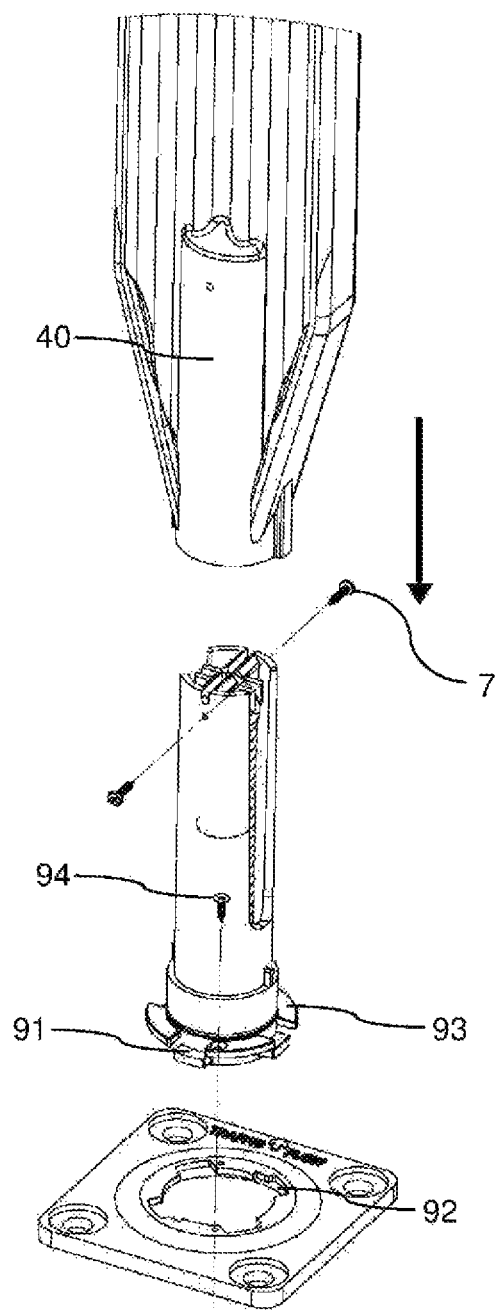
FIG. 9 is a perspective view of the apparatus with a quick-release base plate.

This quick-release arrangement, which allows a user to easily insert, twist and lock a guide post into place, and unlock, twist and remove the guide post, may also be used in a surface mount system as shown in FIG. 9.

Figure 10:
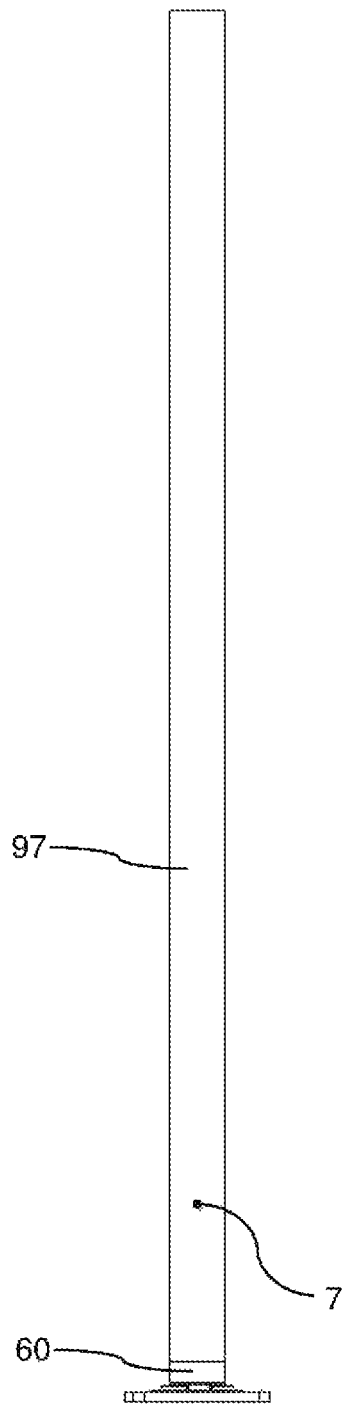
FIG. 10 is a view of the apparatus in use with an alternative post.

The apparatus may be designed to accommodate various upper assembly designs, which allow various types of posts to be readily interchanged. For example, FIG. 10 shows an alternative embodiment of the upper assembly, configured to allow a post to be directly attached to the upper assembly. In this embodiment, upper assembly 60 is designed to accept a round post 97. The upper portion of the upper assembly is dimensioned to fit within a central bore which extends through post 97, and the post is secured in place by securing screws 7. Posts used for roadside signage typically have a nominal bore of 50 mm. The outside diameter of the lower portion of the upper assembly is dimensioned to effectively support the post 97. In this case, the outside diameter of the upper assembly is identical to the outside diameter of the post. The post may be formed from any suitable material, such as impact modified PVC.

The apparatus may be modified for use with any item which incorporates a vertical post, such as a bollard, mail box, solar-powered light, sign post or the like.

Figure 11:
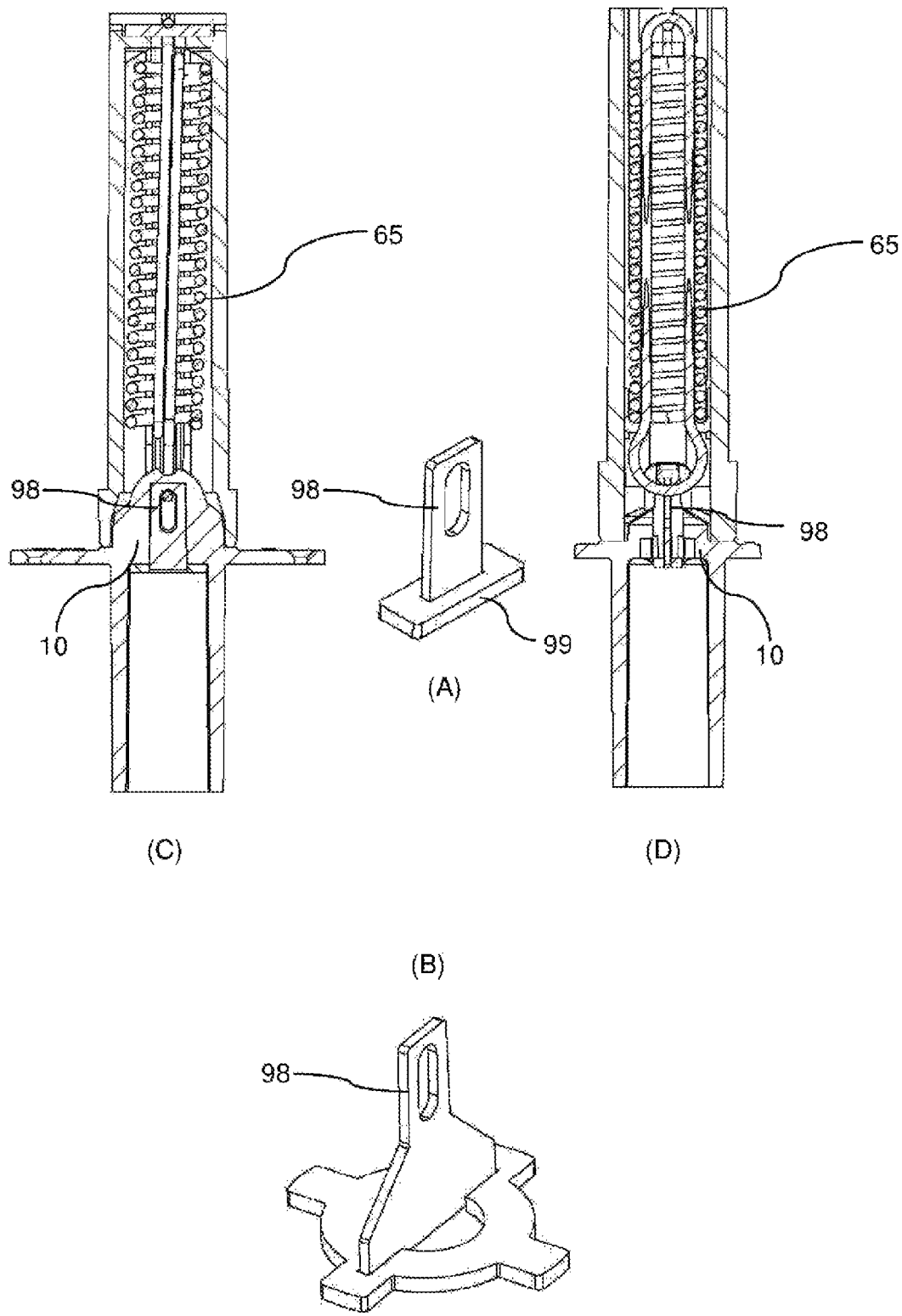
FIG. 11 is a view of an insert which may be fitted to provide additional shock support.

Referring now to FIG. 11, the apparatus may be fitted with an insert 98, such as shown at FIG. 11(A), which provides additional support between lower assembly 10 and resilient member 65. Insert 98 is preferably made of metal, and includes a slot through which the lower spring loop of resilient member 65 is retained. The insert may include a base portion 99 which abuts the lower surface of lower assembly 10, with the insert sliding through a co-operating orifice in lower assembly 10, as seen in FIGS. 11(C) and (D). Alternatively, the insert may be directly attached to a quick release attachment means as seen in FIG. 11(B).

Figure 12:
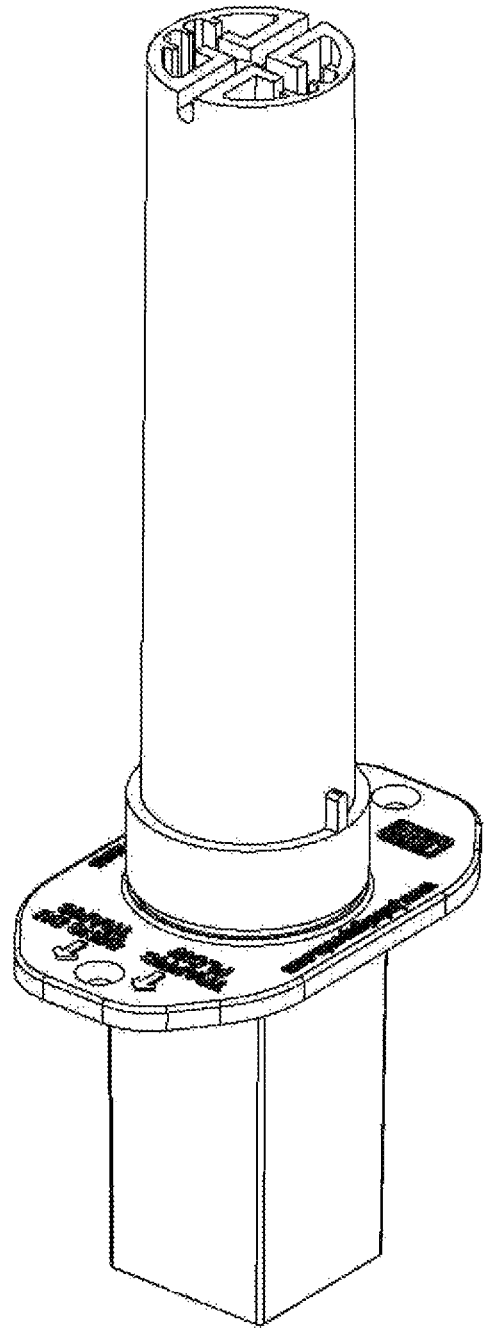
FIG. 12 is a perspective view of the apparatus with a square push in base which is particularly suitable for temporary or portable signage.

FIG. 12 shows the apparatus in use with a square push base, which is particularly suitable for temporary or portable signage. Such signage is useful in the situation where temporary traffic regulation orders are required to impose road and carriageway closures, or traffic restrictions such as lane width and speed limits. Preferably, the square push base complies with the European standard size of 40 mm, though it will be appreciated that the apparatus may be used with push bases of differing dimensions and configurations.

The person having ordinary skill in the art would appreciate that the apparatus is not limited by dimension and that the stated dimensions are merely exemplary, and that other dimensions are suitable for the upper and lower assemblies of the present invention. In a preferred embodiment, the lower assembly is approximately 36±4 mm in height, and 48±5 mm in diameter (excluding tabs 91 and flange members 93). The upper assembly is approximately 179±18 mm in height, and 48±5 mm in diameter. Depending on the material of manufacture, the apparatus may range from several millimeters in diameter to about several dozen centimeters and upwards. For example, such a range could span from about 10 millimeters to about 40 centimeters or more.

The reference to any prior art in this specification is not, and should not be taken as, an acknowledgement or any form of suggestion that the prior art forms part of the common general knowledge in the art.

Although the invention has been disclosed in its preferred forms, it is to be understood that the above embodiments have been provided only by way of exemplification of this invention, and that further modifications and improvements thereto, as would be apparent to persons skilled in the relevant art, are deemed to fall within the broad scope and ambit of the current invention described and claimed herein.

The invention claimed is:
1. A flexible coupling comprising:
a lower assembly having a spigot member;
an upper assembly having a recess adapted to receive the spigot member, the spigot member and recess being mutually configured to allow articulation of the upper assembly with respect to the lower assembly in any direction;
complementary indexing means adapted to circumferentially align the lower assembly and the upper assembly, the complementary indexing means including:

at least one locating element adapted to engage a corresponding locating slot; and at least one helical ramp to direct the at least one locating element into a corresponding locating slot; and a single resilient member interconnecting the lower and upper assemblies, wherein the lower and upper assemblies are urged into mutual engagement against said articulation.

2. The flexible coupling according to claim 1, wherein the single resilient member is a drawbar spring.

3. The flexible coupling according to claim 1, wherein the single resilient member is a tension spring.

4. The flexible coupling according to claim 1, wherein the spigot member includes means to constrain initial impact movement of the upper assembly to minimise lateral displacement.

5. The flexible coupling according to claim 4, wherein the means to constrain initial impact movement comprises a substantially vertical annular surface located at a base portion of the spigot member.

6. The flexible coupling according to claim 1, wherein the spigot member has an upper portion that is partly conical, frusto-conical or spherical in shape.

7. The flexible coupling according to claim 6, wherein the upper portion of the spigot member is shaped to allow the upper assembly to rotate approximately +/−30° around a central longitudinal axis of the flexible coupling.

8. The flexible coupling according to claim 7, wherein the upper portion is shaped to allow connection to the single resilient member.

9. The flexible coupling according to claim 6, wherein the at least one locating element is located at a base portion of the upper assembly.

10. The flexible coupling according to claim 1, wherein the at least one helical ramp is adjacent to a middle portion of the spigot member.

11. The flexible coupling according to claim 1, wherein the lower assembly is releasably attached to a ground engagement means.

12. The flexible coupling according to claim 1, wherein the upper assembly is attached to a post member.

13. The flexible coupling according claim 12, further comprising a guide post attached to the post member.

* * * * *